(12) United States Patent
El-Damhougy (10) Patent No.: US 7,555,468 B2
(45) Date of Patent: Jun. 30, 2009

(54) NEURAL NETWORK-BASED NODE MOBILITY AND NETWORK CONNECTIVTY PREDICTIONS FOR MOBILE AD HOC RADIO NETWORKS

(75) Inventor: Hesham El-Damhougy, Tustin, CA (US)

(73) Assignee: The Boeing Company, Chiacgo, IL (US)

( * ) Notice: Subject to any disclaimer, the term of this patent is extended or adjusted under 35 U.S.C. 154(b) by 379 days.

(21) Appl. No.: 11/426,419

(22) Filed: Jun. 26, 2006

(65) Prior Publication Data
US 2007/0299794 A1    Dec. 27, 2007

(51) Int. Cl.
*G06N 3/02* (2006.01)

(52) U.S. Cl. .............. 706/15; 706/14; 706/21; 370/254; 370/310; 370/351; 455/3.01; 455/437; 455/440; 455/456.1; 455/95

(58) Field of Classification Search .............. 706/14–19, 706/22; 370/254–258, 310, 316, 328, 338, 370/351, 352, 395.21, 395.3, 395.31, 395.32; 455/3.01, 431, 437, 440–441, 448, 449, 456.1, 455/456.5, 456.6, 7, 95
See application file for complete search history.

(56) References Cited

U.S. PATENT DOCUMENTS

| | | | |
|---|---|---|---|
| 6,362,783 B1 * | 3/2002 | Sugiura et al. ............... 342/457 |
| 6,625,462 B1 * | 9/2003 | Arnold ........................ 455/500 |
| 7,042,867 B2 * | 5/2006 | Whitehill et al. ............. 370/338 |
| 7,177,653 B2 * | 2/2007 | McAvoy ................... 455/456.1 |
| 7,181,214 B1 * | 2/2007 | White ...................... 455/435.1 |
| 2005/0117530 A1 * | 6/2005 | Abraham et al. ............. 370/310 |
| 2005/0195761 A1 * | 9/2005 | Alicherry et al. ............. 370/328 |
| 2006/0039300 A1 * | 2/2006 | Ogier et al. .................. 370/254 |
| 2007/0097873 A1 * | 5/2007 | Ma et al. ..................... 370/252 |

OTHER PUBLICATIONS

Kumar et al. "Performance Comparison of Multicast Protocol for Physically Hierarchical Ad Hoc Networks Using Neural Concepts", ICSP'04 Proceedings, 2004, pp. 1582-1584.*
Gelenbe et al. "Linlk Quality-Aware Routing", PE-WASUN '04, ACM, 2004, pp. 87-90.*

\* cited by examiner

*Primary Examiner*—David R Vincent
*Assistant Examiner*—Omar F Fernandez Rivas
(74) *Attorney, Agent, or Firm*—Law Office of Charles W. Peterson, Jr.

(57) ABSTRACT

A self managed ad hoc communications network nodes and node mobility management. Nodes include an Artificial Neural Network (ANN) that determines connection to other network nodes. The ANN may use free space propagation link life estimation, inverse modeling for partition prediction, Stochastic Approximation, and/or coarse estimation. The node includes storage storing network tables and matrices indicating network connectivity and connection to other nodes. Also, a wireless communications unit provides for wireless communicating with other nodes.

39 Claims, 9 Drawing Sheets

NEURAL NETWORK-BASED NODE MOBILITY AND NETWORK CONNECTIVTY PREDICTIONS FOR MOBILE AD HOC RADIO NETWORKS

The present invention is related to allowed U.S. patent application No. 11/187,452, entitled "TACTICAL COGNITIVE-BASED SIMULATION METHODS AND SYSTEMS FOR COMMUNICATION FAILURE MANAGEMENT TN AD-HOC WIRELESS NETWORKS," to Hesham El-Dambougy, filed Jul. 22, 2005; and to U.S. patent application No. 11/426,417, entitled "NEURAL NETWORK-BASED MOBILITY MANAGEMENT FOR MOBILE AD HOC RADIO NETWORKS," U.S. patent application Ser. No. 11/426,425,entitled "NEURAL NETWORK-BASED MOBILITY MANAGEMENT FOR SELF- PARTITION DETECTION AND IDENTIFICATION OF MOBILE AD HOC RADIO NETWORKS," and U.S. patent application Ser. No. 11/426,428, entitled "NEURAL NETWORK-BASED MOBILITY MANAGEMENT FOR HEALTNG MOBILE AD HOC RADIO NETWORKS," to Hesham El-Dambougy, filed coincident herewith, all four assigned to the assignee of the present invention and incorporated herein by reference.

BACKGROUND OF THE INVENTION

1. Field of the Invention

The present invention generally relates to an adaptable mobile communications networks and, more particularly, to an ad-hoc mobile network for adaptable wireless communications in an unstructured environment such as a tactical battlefield.

2. Background Description

Tactical radio communications rely heavily on mobile radio networks and systems that are continually changing while in use. Emerging tactical battlefield networks typically include a collection of mobile autonomous host nodes or terminals that support numerous mobile clients. Unlike a typical commercial mobile telephone network, for example, these mobile nodes are not connected together by fixed land based connections (e.g., hard wired), but continually move into and out of radio communication range with each other. Consequently, one generally cannot rely on a pre-defined fixed infrastructure within this type of environment. Moreover, the nodes may be destroyed, or new nodes may join the network. Thus, such a mobile, wireless network may be considered dynamically changing and so, infrastructure-less or "ad-hoc" in that the nodes and node locations dynamically change over time. As a result, the connectivity among the nodes may vary with time.

Since a typical wireless ad-hoc network lacks fixed communications nodes (e.g., base stations) to define the network, a group of autonomous nodes or terminals serve to define the network. The autonomous nodes form a decentralized multi-hop radio network and communicate with each other to maintain connectivity. Each node may represent radio communication devices that may be located with a person (such as a war-fighter), located on/in a ground or an air vehicles platform, e.g., an Unmanned Air Vehicle (UAV), and an Unmanned Ground Vehicles (UGV). As is typical with any network, such a wireless ad-hoc network can be represented graphically by a set of time varying vertices representing network nodes with edges between nodes that are capable of communicating with each other. So, at any particular time, for example, the network nodes may be represented as a set of points that indicate the node locations at that instant. A graph edge or line between two vertices indicates that the two nodes are connected, i.e., the corresponding nodes can reach each other (or communicate) by a radio link. So, each line represents a radio link between two communicating nodes. Two radio nodes are said to be communicating if the link quality is above a predefined threshold, e.g., where the signal-to-noise ratio (SNR) is above a predefined threshold. Nodes are communicating indirectly or through an indirect path in a path that passes through at least one intermediate node.

Normally, each mobile node in a wireless ad-hoc network can communicate at least with one or more neighboring mobile nodes that are a single radio hop away. Since, typically, the wireless ad-hoc network is operating in the absence of fixed radio relay base stations; each mobile node operates not only as a host but also as a router to relay communications from other connected nodes. Thus, the nodes are typically forwarding/relaying information packets between other mobile nodes in the wireless ad-hoc network that may not be within direct wireless transmission range of each other. So, network control is distributed among the nodes and each node participates in an ad-hoc routing protocol that allows it to discover "multi-hop" paths through the network to any other node.

Further, since the nodes are mobile, and because of node departures and additions, the network topology may change rapidly and unpredictably over time. Nodes can fail, for example, if they are destroyed or due to hard or soft failures which occur in the battlefield. Typical radio communication effects, such as noise, fading, and interference, can impede communications and prevent some nodes from connecting to others. Consequently, for reliable communications the wireless ad-hoc network must be able to compensate for variable link quality. Wireless propagation path loss, fading, multi-user interference, distance between nodes and signal strength variations can all affect connection quality. In addition, operating area/network topology losses can further interfere with communications. Changes in propagation conditions and the environment, such as inclement weather, and irregular terrain (e.g., interrupted by mountains and buildings), for example, can interfere with network communications. Thus, changes in propagation conditions and the environment, as well as the unpredictability of node movements and sporadic node failures, can contribute to the dynamic nature of an ad-hoc network. Further, when links between nodes break, the network can be split into isolated sub-networks. Such a break in the network can create a situation where some nodes cannot communicate with others, i.e., there are absolutely no direct or indirect paths between these nodes. In this case, the network is said to be "partitioned." These problems are even further complicated in a military environment where the preservation of security, latency, reliability, intentional jamming, and recovery from failure are significant concerns.

The Department of Defense (DoD) has instituted an initiative known as the Joint Tactical Radio System (JTRS) to provide a flexible new approach to meeting diverse warfighter communications needs through software-programmable tactical radio technology or "software defined radios (SDRs)." In particular, these SDRs are intended for voice, data and video communications across a battle-space. However, beyond the battlefield, the JTRS may have application for initiatives in areas as diverse as homeland security, Federal, state and local law enforcement, search and rescue, commercial aviation and international commercial applications. The JTRS implements the concept of relay and translation nodes (land, sea, air and space based) to help ensure that tactical users can access required information wherever it resides. To accomplish this, however, nodes must be able to communicate with each other in spite of links being broken frequently as nodes move, randomly fail, or are destroyed e.g., in enemy or unintentional attacks.

Accordingly, there is a need for an ad-hoc mobile network that can adapt well to link changes and in particular to inter-connectivity changes between ad-hoc mobile network nodes. Further, there is a need to maintain network-wide connectivity in ad-hoc networks, i.e., maintaining communication paths, either node-to-node or by multiple-node-hopping and routing, that allows any two nodes to maintain communication with one another.

SUMMARY OF THE INVENTION

An embodiment of the present invention includes nodes for a self managed ad hoc communications network, wherein the nodes manage node mobility within the network. The nodes may include/employ an Artificial Neural Network (ANN) that determines connection to other network nodes and more particularly, for determining the link life between the node itself and other network connected nodes. The nodes may include storage for storing network tables and matrices that indicate network connectivity and connection to other nodes. These network tables may be used for network partition detection, prediction and network healing. Also, the nodes include a wireless communications unit for wirelessly communicating with other nodes. Depending on the radio propagation conditions and network operating environment, free space or general stochastic propagation models may be used for initial ANN training to estimate and predict link life between each node and its neighbors. During real time operation the ANN uses on-line propagation loss measurements for adaptations and smoothing.

An initial estimation of link life may be done using two different approaches. In one approach, inverse modeling is used for a deterministic free space propagation loss model. Otherwise, a Stochastic Approximation (SA) method is used in a general stochastic propagation loss model in two (off-line and on-line) modes. This approach provides a coarse estimation for both off-line and on-line ANN training and adaptation. In off-line ANN training, the propagation loss model is known in advance and is either stochastic or deterministic. During on-line real time operation, direct propagation loss measurements between a network node and other nodes is available and are used for on line ANN adaptation and fine tuning.

Advantageously nodes within, a preferred ad hoc communications network are self-managing and anticipate to adapt well to operating changes, and in particular to interconnectivity changes with other nodes. Nodes determine whether direct connections to other nodes are likely to be lost and when. Thus, the network can prepare for link losses that may partition the network. Sp, the network can be prepared to heal upon or before such a partition. Further, nodes can determine if a disconnected link can be expected to reconnect and, if so, when. By knowing both expected link losses and reconnects, the network can plan for partitions and reconnect and plan for cluster changes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1A:
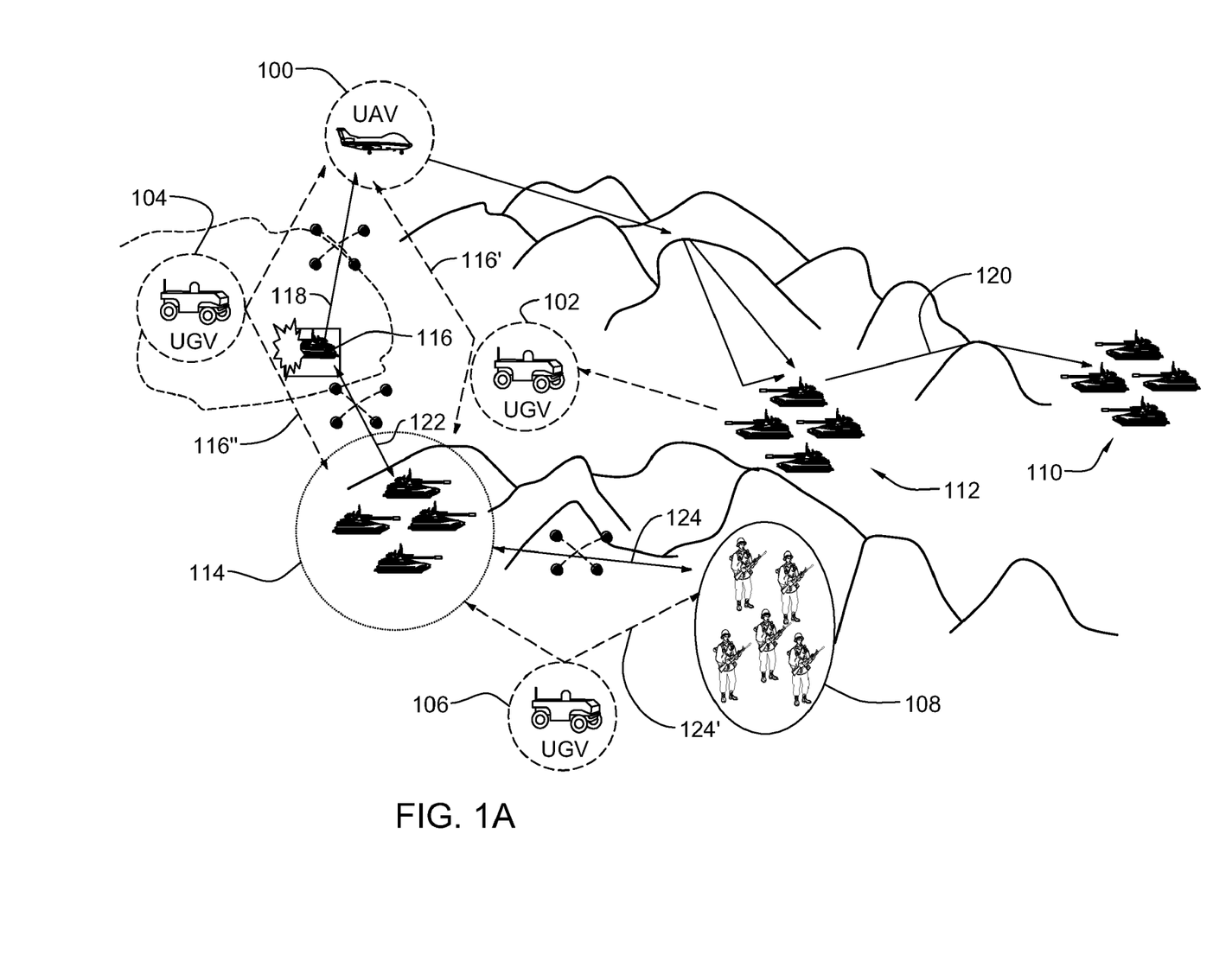
FIGS. 1A-C show a battlefield example of an ad hoc hierarchical mobile communications network and graphical representations of the battlefield example according to an advantageous embodiment of the present invention.
Figure 1B:
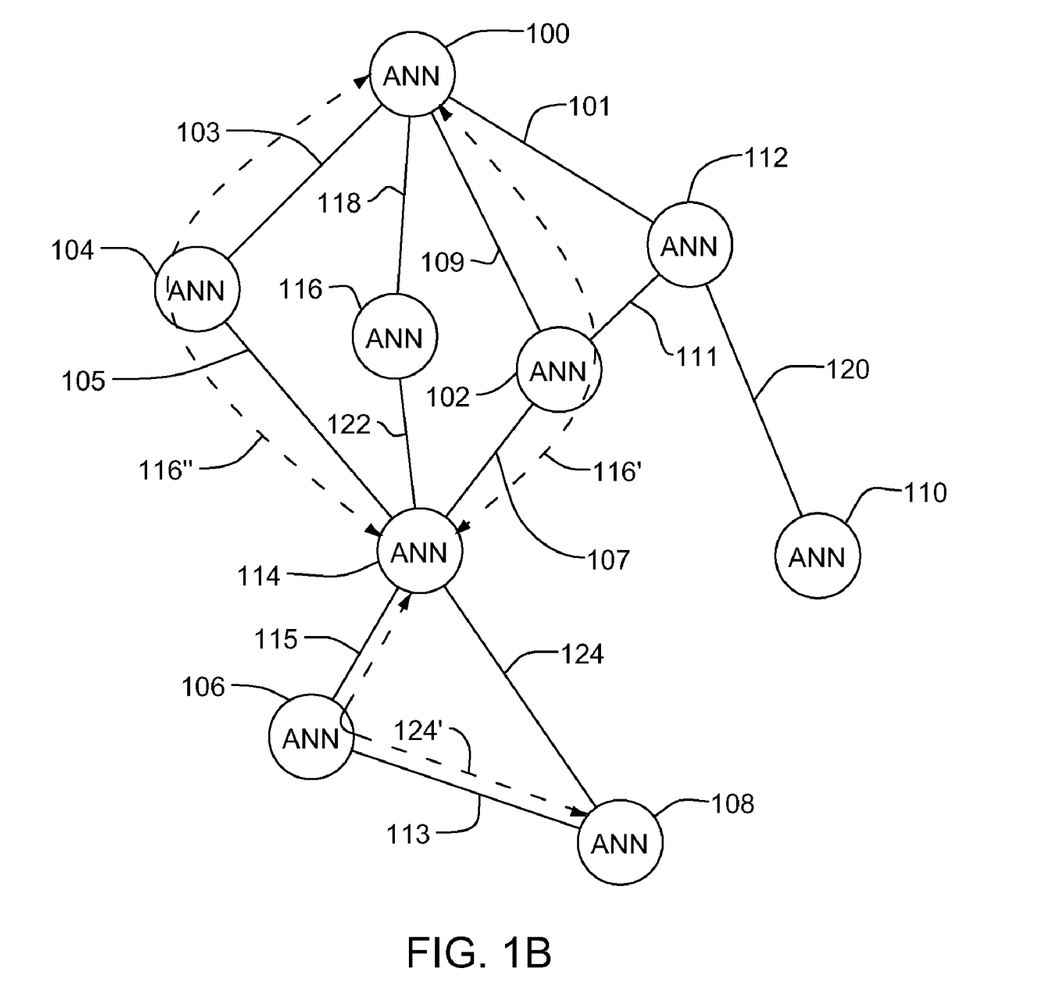
Figure 1C:
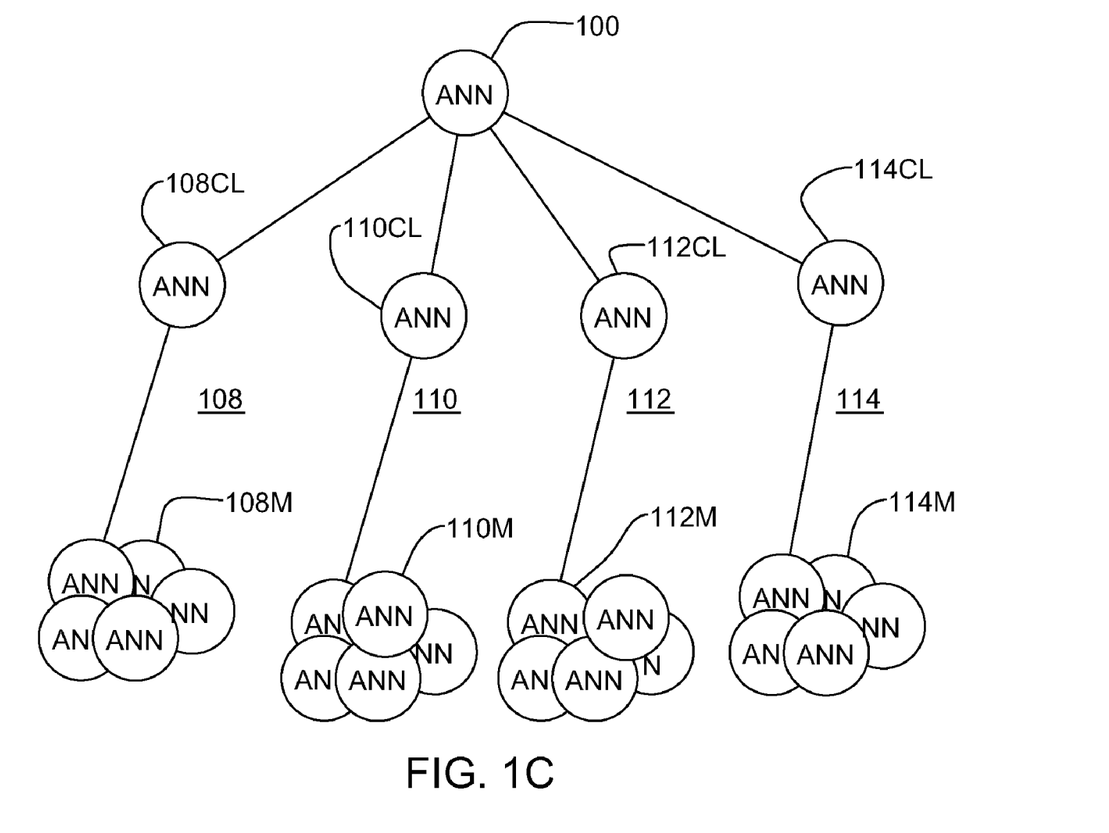

Turning now to the drawings and more particularly, FIGS. 1A-C show a battlefield example of a self monitoring ad hoc mobile communications network and graphical representation of the battlefield example according to an advantageous embodiment of the present invention. The preferred self monitoring ad hoc mobile radio network is an Artificial Neural Network (ANN) based communications network. More particularly, a preferred ad hoc mobile radio network is an Adaptive Self Organizing Neural Network (ASONN) of self monitoring artificial neurons or, an ANN element based communications devices, stations or nodes and is referred to herein as a Mobile Communications Neural Network (MCNN). Each node monitors other directly connected nodes to identify and predict disconnections and, expected re-connections. As shown in this example, a MCNN may include both airborne and ground based communications units or stations as nodes and, preferably is hierarchically organized. Although described herein with reference to a battlefield application, this is for example only and not intended as a limitation. The present invention has application to quickly providing self-sustaining and self-organized communications where no fixed land mobile network may be available or has been destroyed, e.g., in an emergency situation or during a severe natural disaster.

The MCNN airborne nodes may include both unmanned air vehicles (UAVs) 100 and manned air vehicles, e.g., attack helicopters (not shown). Ground nodes may include unmanned ground vehicles (UGVs) 102, 104, 106, and ground forces including, for example, infantry units 108 and manned ground vehicles, e.g., tank units 110, 112, 114 and individual tanks 1 16. Some of these nodes are healing neurons, e.g., UVGs 102, 104, 106, with dynamic time dependent positions. Typically, the healing neurons may be used or recalled for healing the network when/if it is partitioned. Others of the remaining nodes may be used for training or for providing input to the neural network to adapt or readjust the healing nodes (neurons) positions to keep entire network connected. Also, as described herein, each mobile node may employ an ANN element that functions as an approximator for approximating the link life to all neighboring nodes. The ANN elements may be trained either off-line or on-line and, thereafter, continuously adapts to propagation condition changes. Examples of suitable ANN elements is discussed by S. Haykin in "Neural Networks: A Comprehensive Foundation," Macmillan Publishing, New York (1994). The ANN elements can be organized, for example, as Multilayer Perceptrons (MLP), or a Radial basis function neural network. Multilayer Perceptrons are widely used for pattern classification in a feed-forward network, are trained with a standard back-propagation algorithm and, are supervised in training for a desired response.

Further, a preferred MCNN is scalable. So, preferably, to facilitate managing large networks, the MCNN is organized in sub-networks of nodes or groups of nodes. A node is also known as a vertex. A plurality of nodes may be called vertices. Groups of nodes, also called clusters, may be treated as a single node when the cluster has full connectivity or a cluster leader or in the alternative as a cluster. The size, S(C), of a cluster C is the cardinal number C. Each cluster performs substantially as a MCNN within the bounds of the cluster. So, for example, if the infantry unit 108 includes a single MCNN device, the infantry unit 108 is a node. Alternately, each individual soldier in each infantry unit 108 may carry a personal MCNN unit (not shown) for individual communications and, therefore, is a node. Typically, each tank in each tank unit 110, 112, 114, includes a MCNN unit and, therefore, is a node and each tank unit 110, 112, 114 is a cluster. For convenience of discussion, in the graphical representation of FIG. 1B, the infantry unit 108 and tank unit 110, 112, 114 are taken as clusters and represented as a single node in the graph.

Each cluster and each node within a cluster has a known position and velocity and is capable of communicating directly with any other node within the cluster that is within range and not otherwise blocked. In the network graph of FIG. 1B, links between directly connected nodes/clusters 102, 104, 106, 108, 110, 112, 114 and 116 are represented by edges 101, 103, 105, 107, 109, 111, 113, 115, 118, 120, 122 and 124. Edges may also be called links. Two nodes that can communicate directly with each other are directly linked and can exchange information directly with one another. So, for example, the UAV 100 is directly connected, initially, to UVGs 102, 104, tank unit 112, and through link 118 to tank 116. Direct Communication may be blocked between two nodes, for example, by terrain, structures, atmospheric conditions, battlefield conditions (e.g., countermeasures) or otherwise. So, two nodes that cannot directly communicate (i.e., are not linked) can connect over a path through other directly linked nodes and so, are indirectly linked through one or more intervening nodes. For example, tank unit 110 is networked through link 120 to tank unit 112 and so, indirectly connected or linked to other nodes. Tank unit 114 is indirectly connected to the UAV 100, for example, through link 122 to tank 116 and through link 118 from tank 116. Infantry unit 108 connects to the network indirectly through link 124 to tank unit 114. An indirect path between tank unit 114 and UAV 100 may be via 116' or 116" through UVG 102 or UVG 104, respectively. The MCNN diameter is the graph diameter determined by the "longest shortest path" between any two nodes. So, in the present example, the MCNN diameter is the path between the infantry unit 108 and tank unit 110.

Each cluster is organized around what may be called a Cluster leader (CL) or a clusterhead. Typically, an operator selects initial cluster leaders as described hereinbelow and, thereafter, the cluster leaders may each hand off to other cluster nodes whenever the cluster leader determines that such a hand off may be necessary or desired. The size of each cluster is the number of nodes in the cluster. The degree of any node is the number of edges connected to the node, i.e., the number of directly linked nodes. A subset of nodes that are mutually reachable by a path of a given maximum length, k, is referred to as a k-cluster. A clique is a k-cluster with k=1. The infantry unit 108 and the tank units 110, 112 may each include several nodes and so, although represented graphically in FIGS. 1A and 1B as nodes, may each represent a clique or a k-cluster as shown in FIG. 1C.

FIG. 1C shows an example of hierarchical organization of a preferred MCNN with cluster leaders hierarchically organized with several sublevels within the MCNN and within each cluster. The nodes of FIG. 1A including the UAV 100, UGVs 102, 104, 106, the infantry unit 108 and the tank units 110, 112, 114 and tank 116 may each be designated/treated as a cluster. One node is identified as the manager over the entire MCNN and is designated as the Network Management System (NMS), the UAV 100 in this example. A single node is selected as cluster leader 108CL, 110CL, 112CL and 114CL from respective cluster members 108M, 110M, 112M and 114M in each of the infantry unit 108 and the tank units 110, 112, and 114. Each cluster leader 108CL, 110CL, 112CL and 114CL acts as a sub-network (cluster) manager. Optionally, secondary and tertiary or lower order cluster leaders (not shown) may be selected from members 108M, 110M, 112M and 114M in each respective cluster. Each cluster leader 108CL, 110CL, 112CL and 114CL is responsible for inter-cluster communication and cluster leaders 108CL, 110CL, 112CL and 114CL exchange information (e.g., node connectivity and strength, network status, and cluster leader assignment/reassignment information) with each other and with the NMS the UAV 100, e.g., MCNN status. Since each node may include an ANN element, each ANN node may be assigned/assume responsibility as a cluster leader, dynamically, as the cluster changes. Also, typically, each cluster leader may be assigned/assume responsibility as the NMS for the entire MCNN, dynamically, as the network configuration changes. The NMS may act as a local cluster leader or, as an independent node, unassigned to a cluster or assigned to a cluster of one.

Prior to deployment, simulation results are collected for training the nodes, preferably, from theater simulation as described in U.S. patent application Ser. No. 11/187,452, entitled "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005, assigned to the assignee of the present invention and incorporated herein by reference. Preferably, training is also done using artificial neurons, which may or may not be identical to the neurons 130 in the network or neurons located in healing nodes. After training an operator, for example, identifies cluster leaders and one node as the NMS. The nodes receive theater information and training results from the simulation that may include, for example, a coarse terrain map, a mission mobility profile, and coarse propagation models. The coarse propagation models may include suitable well-known telecommunications models, such as for example, an Epstein-Peterson model for physical analysis and mixed mode models, such as ITU Radiocommunication Sector (ITU-R) and Longley-Rice/Longley-Rice Adaptive models. Thereafter, the NMS and cluster leaders continually monitor MCNN status and predict network changes based on node mobility for real time network planning and healing.

Preferably, the MCNN is organized or voluntarily partitioned (clustered) into sub-networks of nodes or clusters. At least initially, each cluster is a group of related nodes with a relationship based on the physical relationship of the respective nodes, e.g., based on command structure and/or physical location. Each cluster organized around what may be called a Cluster leader (CL) or a clusterhead. As nodes move about a given area, some nodes may switch from one cluster to another and occasionally, within a cluster, cluster leader nodes can handover that responsibility to another more qualified node. For an example of cluster identification and cluster leader selection, see, U.S. patent application Ser. No. 11/426, 417, entitled "NEURAL NETWORK-BASED MOBILITY MANAGEMENT FOR MOBILE AD HOC RADIO NETWORKS," to Hesham El-Dambougy, filed coincident herewith, assigned to the assignee of the present invention and incorporated herein by reference.

Typically, because of node mobility, at any given time some clusters may not be able to communicate directly and/or indirectly with others. So, the nodes monitor connectivity with other nodes as described hereinbelow to track individual connections to each other, and form and maintain a connectivity matrix. The connectivity matrix is a table that indicates the position of every node in the cluster and represents all node connections for each node. The NMS maintains a connectivity matrix for the entire MCNN. Preferably, each cluster leader maintains a local copy of the connectivity matrix with rows and columns corresponding to specific nodes and ones and zeros indicating connectivity (1) or non-connectivity (0) directly between any two nodes in a network.

During normal operation where nodes may be constantly in motion, periodically, each node sends connectivity table updates to the cluster leader. Preferably, for computational efficiency, a node initiates an update to the cluster leader only when table entries change in the node and each node sends only the changed entries. Occasionally, changes may occur to the network randomly, e.g., from unanticipated node additions and deletions. Other changes may be more predictable, e.g., from terrain or weather changes. So, for example, some nodes may move out of range of others, local interference such as terrain or countermeasures may block communications between nodes, and some nodes may even be destroyed. Also, intermediate paths may change as new nodes add themselves to the MCNN or as previously connected nodes reconnect. Whenever a link is lost, any disconnected nodes must find alternate connection paths that may force MCNN partition changes. With tank 116 (in FIG. 1A) destroyed, the loss of links 118, 122 interrupts the indirect connection between tank unit 114 and UAV 100. Consequently, tank unit 114 must reconnect indirectly to UAV 100 through UGV 102 or 104 over path 116' or 116".

Each cluster leader monitors link quality in the cluster and maintains tables and matrices, such as the connectivity matrix (for k nodes in the cluster, the cluster leader maintains connectivity matrices $C_1, C_2, \ldots, C_k$) and a link life matrix, for local nodes within the cluster. Link life is the length of time a particular pair of connected nodes are expected to stay connected. In each cluster the cluster leader or, another designated node within that cluster, determines link life for each pair of nodes within the cluster as described hereinbelow. So, typically, the cluster leaders also maintain a link life estimation matrix that quantitatively indicates a value for link life between any two nodes in the cluster. Nodes at rest (not moving) may be represented as having an arbitrarily high link life value, e.g., a defined maximum. Additionally, frequently nodes are reconnected to other nodes that had been linked. The cluster leaders may also determine an expected reconnect time for separated nodes. Periodically, the cluster leader distributes updates, both to local nodes and to the NMS, and exchanges link life and reconnect information with the NMS. Preferably, for computational efficiency the cluster leaders initiate updates only when matrix/table entries change for the respective cluster and each cluster leader sends only changed entries. The NMS can use the updates to arrive at an overall network or global connectivity matrix. Alternately, the global connectivity matrix can be maintained at one or more of the cluster leaders instead or in addition to the NMS.

As noted hereinabove, link life/reconnect estimations are necessary because under typical operating conditions, e.g., in the battlefield, all nodes are continually in motion, signals between nodes may be changing continually and, consequently, so is MCNN connectivity. Thus, at any point in time, each node may lose contact with linked nodes and/or make direct contact or re-establish direct contact with previously disconnected nodes. The NMS manages and coordinates these network changes (link losses, node additions and deletions) with the cluster leaders and each cluster leader manages and coordinates changes within its respective cluster. As also noted, each node continually gathers connectivity data with connected nodes, e.g., signal strength, relative direction of travel and relative speed. The collected data is distributed throughout the MCNN for maintaining connectivity. The NMS and cluster leaders use the collected data in node mobility prediction to track and predict node movement for maintaining connectivity through partition changes that may be caused by predictable/forecastable events, e.g., nodes disconnecting/losing direct links and disconnected nodes reconnecting. Node mobility prediction and healing may be done using a free space propagation link life estimation approach, an inverse modeling for partition prediction approach, stochastic approximation, and coarse estimation, Stochastic Approximation (SA). Further, the particular approach used may depend upon the propagation environment. SA is advantageous for accommodating the stochastic nature of the environment. Also, the SA approach, when combined with on-line propagation loss measurements, obviates the need for developing/providing a propagation model prior to training.

FIGS. 2A-D show an example of a pair of nodes on a meandering path 130 with the first node traversing with velocity $V_1$ from 132 to 134 to 136 and the other node traversing with velocity $V_2$ from 138 to 140 to 142. The path 130 may be, for example, a mountain trail winding around mountainsides or a path circumnavigating local bodies of water, e.g., lakeside or along a river bed. Initially at time $T_0$, the nodes are at locations 132 and 138, respectively. Since the distance (d) between the nodes is less than the maximum radio propagation range ($D_0$), the nodes are directly connected or linked. Specifically, $D_0$ is the distance at maximum allowable propagation loss threshold ($\rho$) for minimum acceptable signal to maintain communications. As the nodes move along the path, the nodes separate until at time $T_1$, the distance between the nodes at locations 134 and 140 is greater than $D_0$. So, the distance between the nodes is too great to maintain communications and the link is broken as the nodes disconnect. The nodes continue with one node reversing travel direction (e.g., at the opposite side of a mountain or lake) and at time $T_2$, when the nodes are again within $D_0$ of each other at locations 136, 142 and so, are close enough to reestablish the connection or reconnect. According to an advantageous embodiment of the present invention, each node monitors linked nodes, using any of a number of suitable approaches, to identify and predict disconnections and, expected re-connections. Suitable approaches for monitoring node mobility include, for example, Free Space Propagation Estimation, Inverse Modeling, Stochastic Approximation (SA) and Coarse Estimation, each of which is described herein.

Free Space Propagation Estimation for a particular node, essentially, ignores environmental and terrain contribution to signal loss and converts linked nodes to relative space for that node, i.e., with the node at the origin. Each node has a relative motion to every other node. As linked nodes move in a given theater, from the point of view of one node the relative motion of another may be characterized by its respective relative velocity (V). Since each node is aware of its velocity $V_n$ and linked nodes can exchange information, including the velocity of each, e.g., directly or indirectly, with connectivity information. So, for one node, the relative velocity for any node may be determined using vector analysis as $(V=V_2-V_1)$. The relative speed of two nodes is the magnitude of the relative velocity, i.e., $\|V\|=(V_1 \cdot V_1.)^{1/2}$. So, returning to the example of FIG. 1A, infantry unit 108 with a velocity $V_{108}$ has a relative velocity at tank unit 114 with a velocity $V_{114}$, that is determined by $V=V_{108}-V_{114}$. For a given propagation range $(D_0)$, two separating collocated nodes remain linked for a period $(T_0)$ or link life, determined by $T_0=D_0/\|V\|$. Noting that signal strength is inversely proportional to distance and, so, propagation loss is directly proportional, this relationship can be generalized for the example of FIG. 2B to determine link-life $T_{LL}$ for two nodes separated by a distance d at 132, 138, substituting $d_0$ for d, by $T_{LL}=(T_0-t)=(D_0-d)/\|V\|$. So by determining link life for the above example, when a link (e.g., 124 in FIG. 1A) between the tank unit 114 and the infantry unit 108 is expected to break, the infantry unit 108 may be prepared to seamlessly reconnect through UGV 104 over path 124' at the time of or before the link 124 is lost.

Figure 2A:
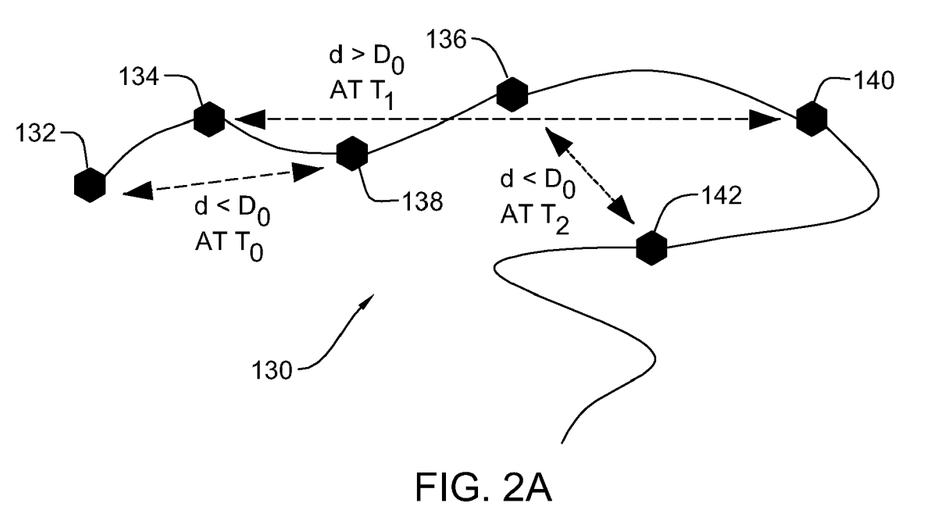
FIGS. 2A-D show an example of a pair of nodes on a meandering path with the first node traversing with velocity $V_1$ and the second node traversing with velocity $V_2$.
Figure 2B:
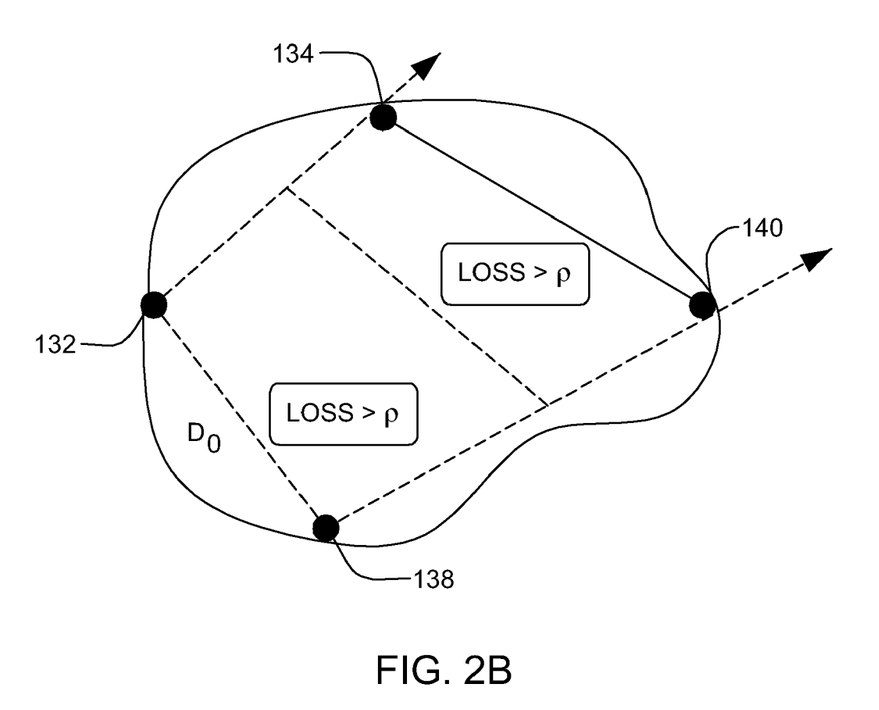
Figure 2C:
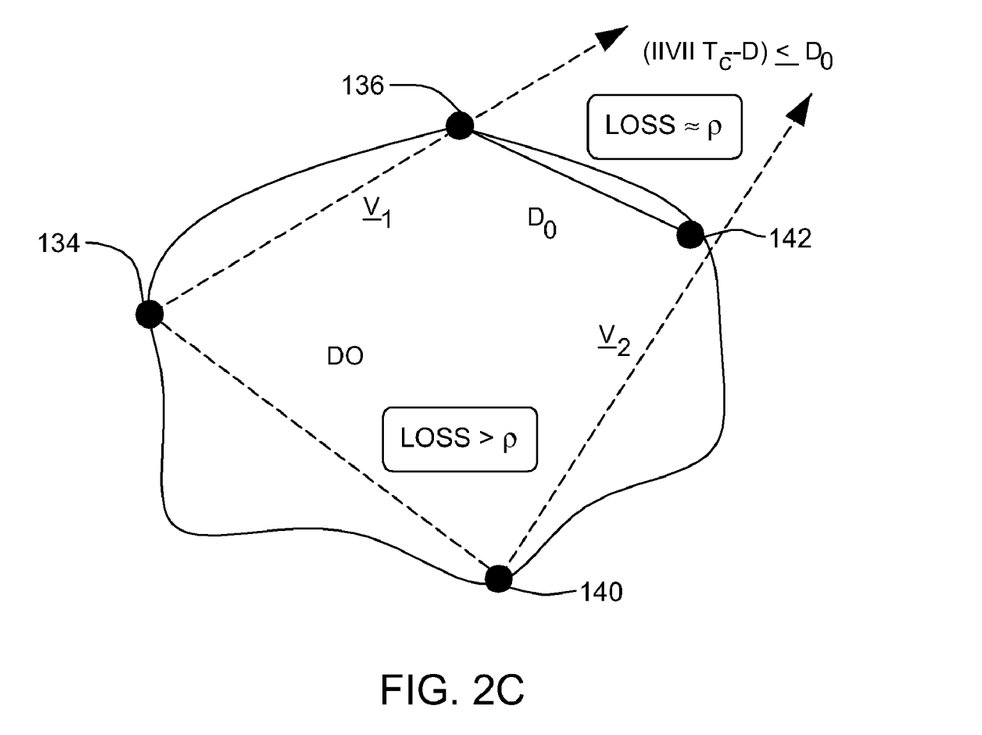
Figure 2D:
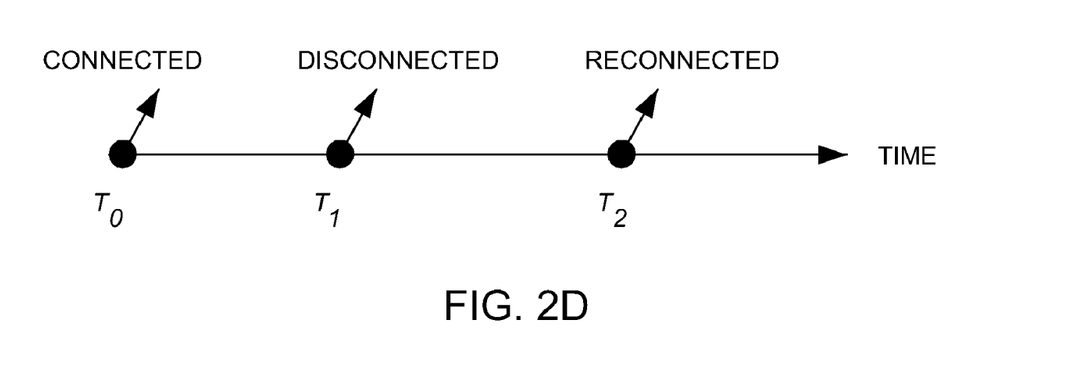

Similarly, when a node knows the relative location and velocity of a disconnected node, the node may use the same approach for determining a reconnect time $(T_c)$ for the disconnected node, e.g., reconnecting as shown in FIG. 2C. When the disconnected nodes find distance is decreasing (i.e., after $T_1$), the reconnect time $(T_2=T_c)$ may be determined from the relationship, $\{(\|V\| \cdot T_c-d)-D_0\}=0$, and $T_c=\text{Min }\{(\|V\| \cdot T_c-d) \leq D_0\}$. It should also be noted that as long as the nodes are disconnected, $(\|V\| \cdot T_c-d) > D_0$.

Figure 3A:
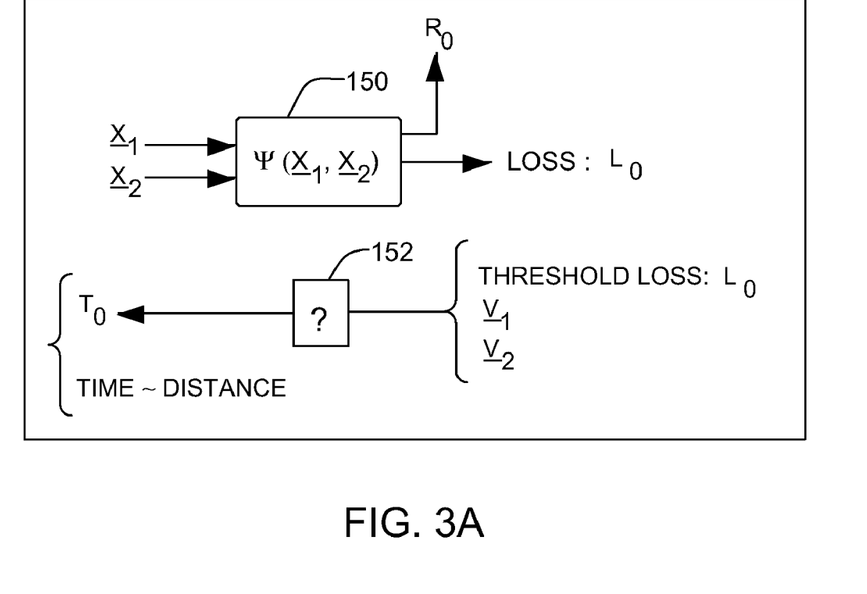
FIGS. 3A-D show a graphical representation of Naïve model for Inverse Modeling.
Figure 3B:
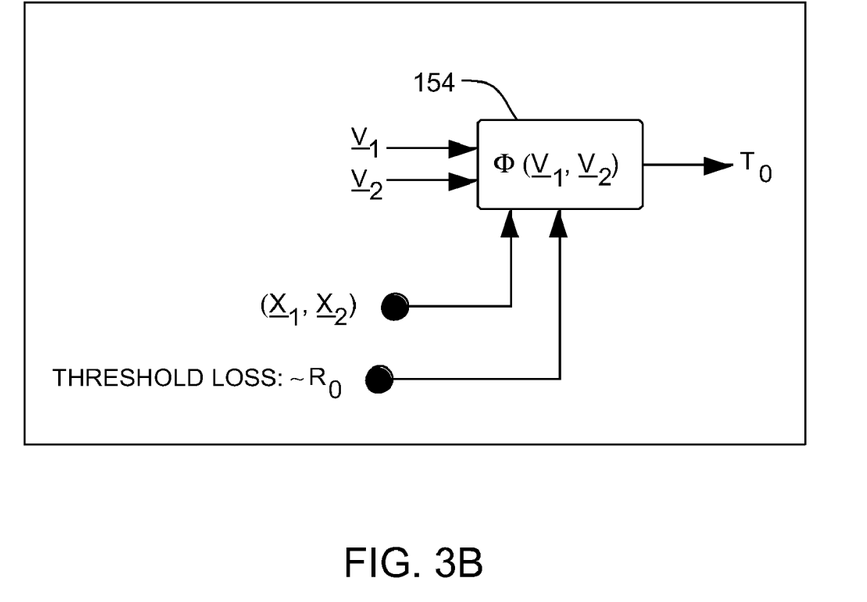
Figure 3C:
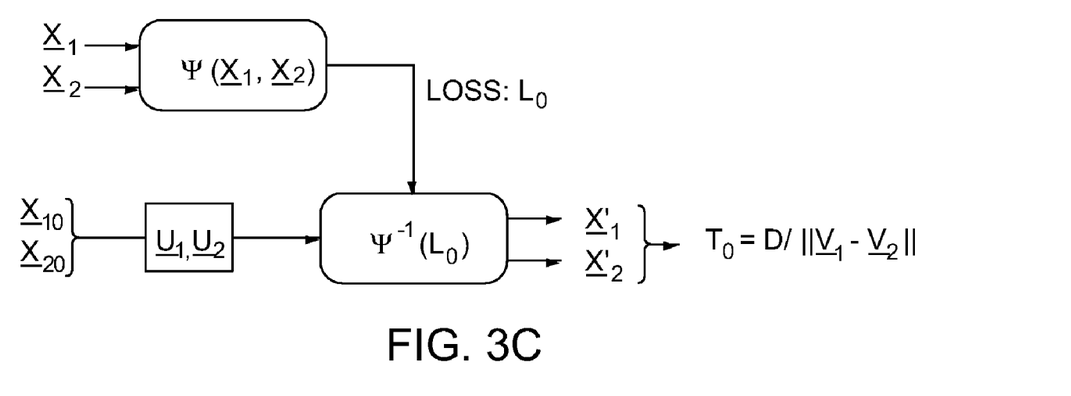
Figure 3D:
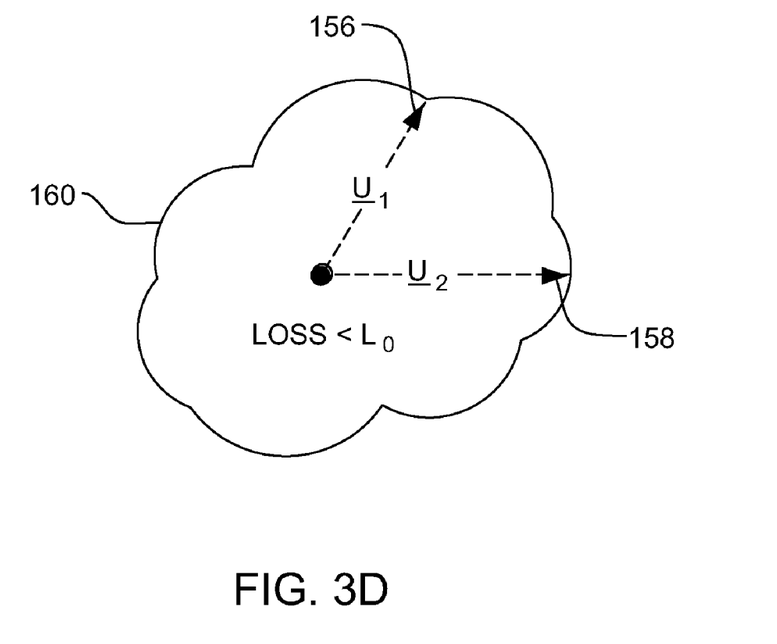

FIGS. 3A-D show a graphical representation of Naïve model for Inverse Modeling. In this example, network nodes are modeled as location vectors $(X_1, X_2)$ with a direction and magnitude of a respective velocity vector $(V_1, V_2)$. The location vectors may be used in a propagation loss relationship $(\psi(X_1, X_2))$ 150 that provides a minimum additional separation with, or propagation loss $(L_0)$ between, the two before disconnect, i.e., at the maximum radio propagation range $(D_0)$. A time to disconnect $(T_{DC})$ may be determined 152 from the additional propagation loss and the respective velocity vectors. From this, the overall model may be represented by a link life relationship $(\Phi(X_1, X_2))$ 154 between the link life and the location vectors, velocity vectors and maximum radio propagation range. Generally, given propagation loss, the inverse of the propagation loss relationship cannot be solved for $X_1$ and $X_2$ (i.e., $\psi^{-1}$ is not determinative in the sense that several distinct domain variables are mapped to the same value by $\psi$, e.g., as shown in FIG. 3D), while a solution exists for the link life relationship, $\Phi$.

This Naïve model may be generalized for any terrain in a general terrain function. A propagation loss function $(d(\xi,\zeta) \{or \Psi(\xi,\zeta)\})$ may be derived for the particular expected theater, e.g., off-line during simulation, or empirically, for example, from data collected on the battlefield. A general signal quality function $(G(\xi,\zeta))$ to indicate link signals within the battlefield may be derived from the propagation loss function with the general signal quality function having the form $G(\xi,\zeta)=(d(\xi,\zeta)-L_0)$. Thus, disconnects between the relevant nodes may be determined by finding the zeros of the function $G(\xi,\zeta)$. So, for a pair of nodes, initially at given locations $(X_{10}, X_{20})$ and traversing to final locations $(X'_1, X'_2)$ separated from each other by a distance (D) with a known minimum acceptable signal at propagation loss $(L_0)$, the link life time may be determined from $D/(V_1, V_2)$. This may be generalized, for unknown locations $(X_1, X_2)$, as shown in the example of FIG. 3C by $(X'_1, X'_2)$ which are estimates of $(X_1, X_2)$. Also, $(u_1, u_2)$ are unit vectors (e.g., 156, 158 in FIG. 3D) in the direction of $(X_1, X_2)$ that have a propagation loss less than $L_0$ at contour 160.

Stochastic Approximation includes environmental and terrain contributions to signal loss in determining the propagation loss threshold in link life computations/determinations. In particular, link life is determined by recursively determining distances between nodes at discrete times with the locations being incrementally derived based on initial node locations to arrive at intermediate and final (for the link between the nodes) node locations. So, in Euclidean Space $(R^3)$, propagation path loss between two arbitrary points $(x,y \in R^3)$ may be expressed in terms of a deterministic monotonic function $(d(x,y))$ that relates the distance between the points and, a random environment/terrain dependent variable $(\epsilon)$. This expression has the form $d(x,y)+\epsilon$. Typically, $\epsilon$ is log-normally distributed in land mobile radio environments. It may be shown that $d(x,y)$ can be approximated to any degree of accuracy using an ANN, such as a preferred MCNN node, including feed-forward and radial basis function networks. Haykin, *Neural Networks, A Comprehensive Foundation,* Prentice Hall (1999), describes predicting propagation losses using an ANN.

So, for stochastic approximation in addition to determining endpoints (i.e., at an initial and a final node location) where propagation loss exceeds the threshold $(\rho)$, spacing $(D_m)$ between the locations $(\underline{x}_m, \underline{y}_m)$ of the nodes at a number (n) of intermediate points is also determined from both node positional information and also, considering environmental and terrain affects. Also, intermediate node locations are recursively and sequentially projected, each based on its most recent previous node locations (e.g., $\underline{x}_{i+1}=\underline{x}_i+V_i\Delta t_i$) and, ultimately the original locations $(\underline{x}_0)$. Thus, a spacing sequence is determined with the form $D_{n+1}=D_n-\alpha_n\{d(\underline{x}_n,\underline{y}_n)-\rho\}$, where $n=0, 1, 2, \ldots, \alpha_n$ is a decreasing sequence of real numbers satisfying: $\alpha_n \to 0$, and $\Sigma \alpha_n \to \infty$ as $n \to \infty$; $d(\underline{x}_n,\underline{y}_n)=d(\underline{x}_n(D_n), \underline{y}_n(D_n))$ and $D_n \to D$ (or $\rho$, the propagation loss threshold distance) as $n \to \infty$ with a probability of 1, e.g., $\{\alpha_n=1/n, n=1, 2, \ldots, \infty\}$. See, e.g., H. J. Kushner et al, "Stochastic Approximation for Constraint and Unconstrained system," Springer 1978. So, for given known node velocities $(V_1, V_2)$ and distance D, the final node positions can be determined and, again, $T_{LL}=D/\|V_1-V_2\|$. It should be noted that it is unnecessary to know the final or intermediate locations of the nodes to determine D, just the initial locations, $\underline{x}_0$ and $\underline{y}_0$.

Alternately, for a stochastic approximation of T, the link life between the two nodes may be obtained by forming a position based time sequence between the two points $x_n$ and $y_n$ and based on the propagation loss $(d(\underline{x}_n, \underline{y}_n))$ between the points at time $T_n$ (i.e., with the points located at $\underline{x}_n=\underline{x}_n(T_n)$ and $\underline{y}_n=\underline{y}_n(T_n)$); and the propagation loss has the form $d(\underline{x}_n, \underline{y}_n)=d(\underline{x}_n(T_n), \underline{y}_n(T_n))$. So, this alternate position based time sequence has the form $T_{n+1}=T_n-\alpha_n\{d(\underline{x}_n, \underline{y}_n)-\rho\}$, $n=0,1, 2, \ldots$, where $\alpha_n$ is a decreasing sequence of real numbers satisfying: $\alpha_n \to 0$ and $\Sigma \alpha_n \to \infty$; $T_n \to T$ as $n \to \infty$ with probability one, e.g., $\{\alpha_n=1/n, n=1, 2, \ldots, \infty\}$. It should be noted that the values $d(x_n(T_n), y_n(T_n))$, can either be obtained either using a prior known model or by direct measurements during real time system operations.

Thus, having determined the link life for a particular link, a reconnect time can be determined using analysis similar to the free space propagation approach discussed hereinabove as discussed with reference to FIG. 2C. It is relatively simple to test whether a pair of nodes are expected to reconnect. In particular, the nodes will reconnect if $d(x, y)$ is monotonically decreasing in the neighborhood of $\underline{x}_0$ and $\underline{y}_0$ in the unit vector direction of $V_1, V_2$, respectively. In other words, the nodes will reconnect if $\delta[d(\underline{x}_0, \underline{y}_0)]<0$ in the direction of $V_1, V_2$ and, link reconnect time can be determined, recursively, using the sequences $D_n$ or $T_n$.

Coarse estimation has application where the propagation loss function described for the inverse modeling approach is determinative, i.e., $\psi^{-1}$ is determinative. In this case, node separation occurs at zeros of $G(\xi,\zeta)=(d(\xi,\zeta)-\rho)$. So, again, $T_{LL}=D/\|V_1-V_2\|$, where D is the separation at a selected zero. This approach may be used for subsequent or additional adaptation and fine tuning.

Although requiring a trade off between link propagation signal margin and accuracy, stochastic approximation is more accurate and provides more practical and useful results than the other described methods. This is because measured locational values include a stochastic component that is otherwise not considered. As noted hereinabove, typically, $\epsilon$ is log-normally distributed in most land mobile radio environments. However, the other approaches may minimize the impact of this propagation path loss random component ($\epsilon$) on system performance analysis accuracy by providing enough/sufficient RF link margin (propagation path loss margin) to minimize the random propagation path loss component impact on system performance and accuracy. See, for example, Parsons, "The Mobile Radio Propagation Channel;" Wiley, 2000.

Figure 4:
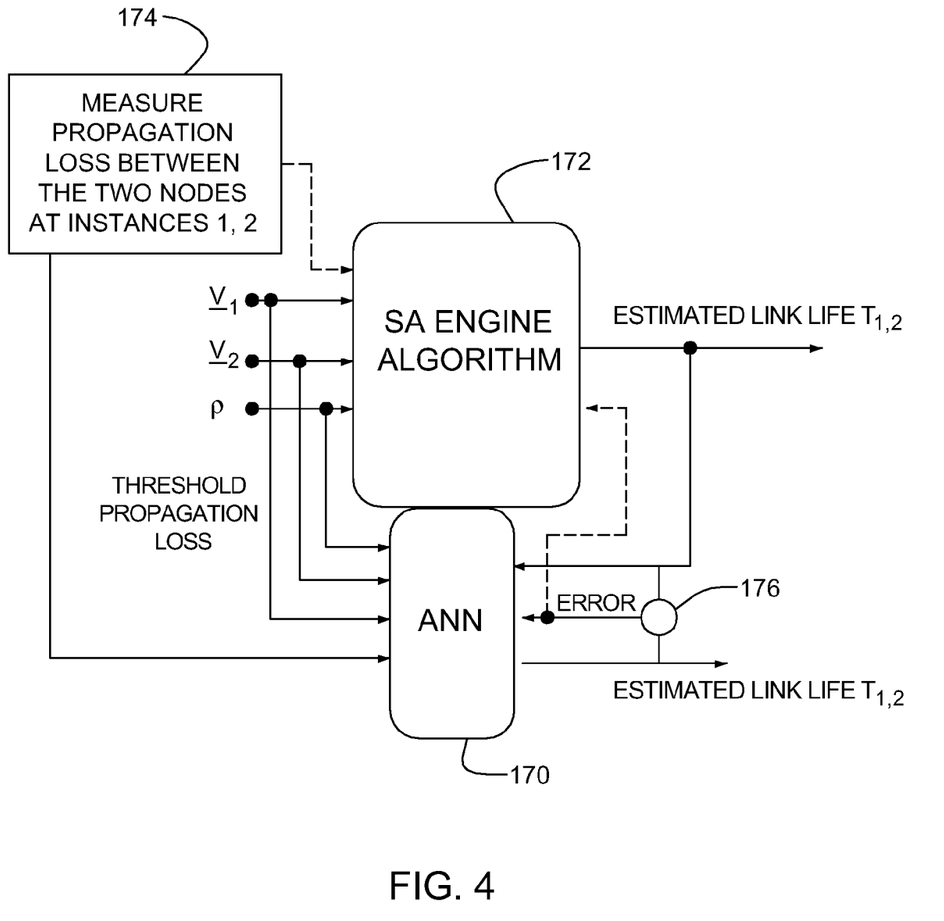
FIG. 4 shows an example of training a node 170 for on-line real time link life estimation operation using a stochastic approximation engine (SA Engine).

FIG. 4 shows an example of training a node 170 for on-line real time link life estimation operation using a stochastic approximation engine (SA Engine) 172 according to an advantageous embodiment of the present invention. Preferably, inputs to the training node 170 and SA Engine 172 include, for example, radio node mobility patterns, terrain information, an appropriate propagation loss model, stochastic node losses or destructions and propagation loss measurement errors. The node mobility patterns can include, for example, node locations and velocities. Terrain information can include the locations of hostile areas, vulnerable regions and inhospitable locales, e.g., rivers and lakes. The propagation loss model may be a function of the separation loss based on node locations in the propagation space, e.g., $d(x, y)$ in Euclidian $R^3$ space. Propagation loss measurement error is normally log normally distributed such that loss over $d(x, y)$ is a sequence where each instance includes both a deterministic component 174 and a random component ($\epsilon$) 176 and has the form $d(x_m, y_m)+\epsilon_m$. So, the random component 176 has a zero mean and is, itself, a sequence of mutually independent and identically distributed random (sequential) variables $\epsilon_m$. Propagation loss is measured periodically between the node 170 being trained and another linked node. The node 170 uses the propagation model function 174 as coarse estimate for future values at the SA Engine 172. So, for any period that $d(x, y)$ is monotonically increasing/decreasing, after training the node 170 can predict link life. The training results are a time based sequence that network nodes use for partitioning then network and identifying when and how to partition.

Figure 5A:
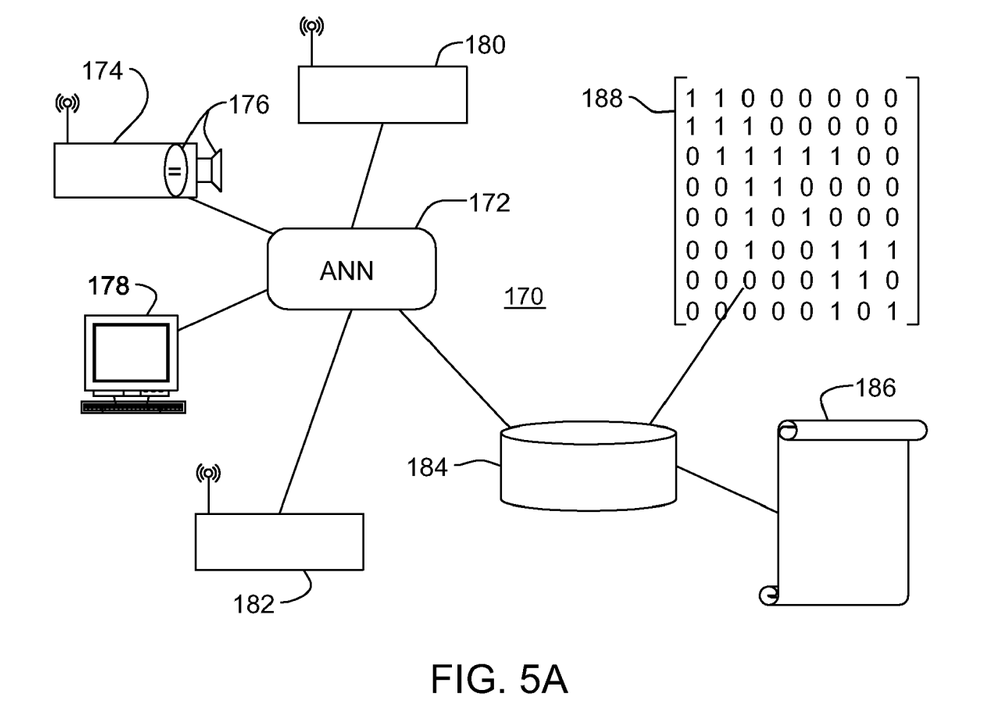
FIG. 5 shows an example of a trained node providing an incremental propagation loss relationship for determining propagation loss at intermediate node locations for a hybrid inverse model.
Figure 5B:
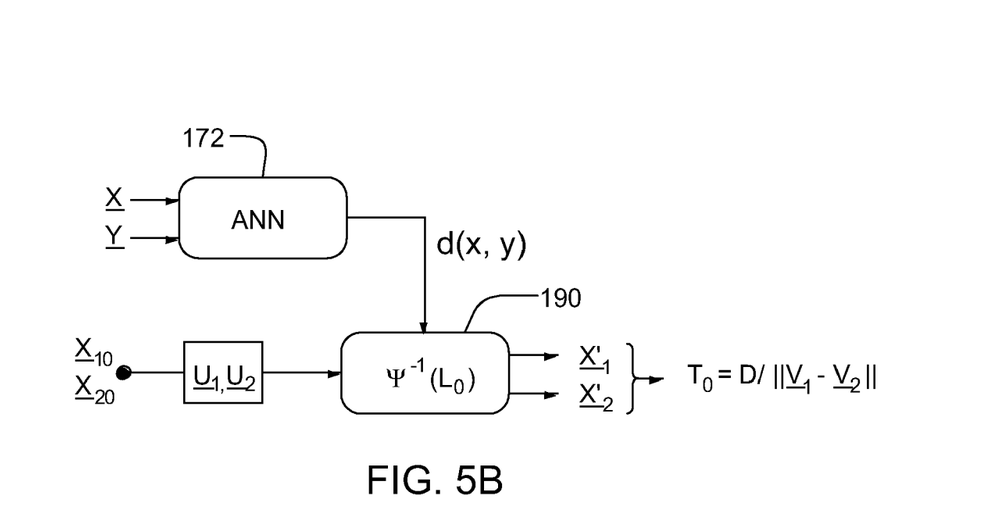

FIGS. 5A-B show examples of a block diagram of a trained node 170 that includes an ANN element 172 and, application of the trained node 170 providing incremental propagation loss relationship for determining propagation loss at intermediate node locations for a hybrid inverse model. Typically, a preferred node 170 includes a wireless communications capability or unit 174 for communicating with other nodes. Although for military applications, each preferred node 170 may be specially designed according to military specifications, for other applications, the nodes 170 may be suitably adapted state of the art wireless communications devices equipped with an ANN element 172. So, preferably, the wireless communications unit 174 also includes a local input/output (I/O) capability, e.g., for voice 176, image 178 or text.

Optionally, the I/O capability may be provided by a suitable I/O port, e.g., connected to the ANN element 172 and the wireless communications unit 174. Also, the node 170 may include some locational capability (e.g., a Global Positioning Systems (GPS)) 180 and/or a typical wireless Local Area Network (w-LAN) 182, e.g., wi-fi, capability for receiving information generated off-line, e.g., on a main-frame computer prior to deployment. Further, a preferred node may include any suitable number of such exemplary wireless capabilities 174, 180, 182, which may be included individually or integrated as a single wireless capability. Also, a preferred node includes local storage 184 that may be non-volatile storage, volatile storage or both. Suitable non-volatile storage may include, for example, hard disk storage, Read Only Memory (ROM) and Electrically alterable ROM such as Flash EEPROM. Normally, the local storage 184 contains terrain information, previously supplied learning parameters and local copies of network information including tables 186 and matrices 188, e.g., a network connectivity table and connectivity matrix. Further, the node 170 may be a collection of suitable elements, a wireless device that includes an ANN element 172 or an ANN element 172 that includes wireless capabilities 174, 180 and/or 182. In FIG. 5B with $(u_1, u_2)$ being unit vectors in the direction of $(V_1, V_2)$, the inverse propagation loss relationship 190 is applied to an intermediate propagation loss value from the ANN element 172 analogous to the inverse model example of FIG. 3C, for a more accurate result.

Moreover, after training, the training results may be used for healing node placement and trained nodes can predict link-life for partitioning and reconnects for network healing. Cluster leaders can also take some local actions with respect to the cluster, such as partitioning the cluster, if necessary, and healing the cluster partitions after partition changing events, e.g., loss of a link or a node or loss of communications with a node linking partitions. Typically, the MCNN may be partitioned as the result of lost links or to maintain communication across partition boundaries and individual clusters may be partitioned into smaller clusters. For example, the infantry unit 108 of FIG. 1 may split into smaller groups. Network/cluster partitioning is described, for example, in U.S. patent application Ser. No. 11/426,425,entitled "NEURAL NETWORK-BASED MOBILITY MANAGEMENT FOR SELF-PARTITION DETECTION AND IDENTIFICATION OF MOBILE AD HOC RADIO NETWORKS" to Hesham El-Damhougy, filed coincident herewith, assigned to the assignee of the present invention and incorporated herein by reference. After splitting the cluster leader may determine a time-to-reconnect, for example.

Since typically, the NMS and/or the responsible cluster leader determine(s) an expected time-to-reconnect, find alternate connection paths, reposition healing nodes, or whether to reconfigure the partitions to heal the MCNN. Network planning and healing is described for example in U.S. patent application No. 11/426,428,entitled "NEURAL NETWORK-BASED MOBILITY MANAGEMENT FOR HEALTNG MOBILE AD HOC RADIO NETWORKS," to Hesham El-Dambougy, filed coincident herewith, assigned to the assignee of the present invention and incorporated herein by reference.

Advantageously, a preferred ad hoc communications network is self-managing and adapts well to operating changes, and in particular to interconnectivity changes between preferred nodes. After initially identifying hierarchically organized network leaders, cluster nodes monitor positional changes and relocate themselves and healing nodes as the situation requires. Further, a preferred ad hoc communications network monitors links for potential disconnects and disconnected nodes for potential reconnects for optimized node connectivity to maintain network-wide connectivity in spite of and in anticipation of node and connection changes. Network down time and lost communication may be avoided even from the loss of a shared links by predicting the loss and reconfiguring the network at or before a disconnect.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

I claim:

1. A node for use in an ad hoc communications network including a plurality of connected said nodes, said node comprising:
   an Artificial Neural Network (ANN) element;
   a storage unit communicatively coupled to said ANN element; and
   a wireless communications unit communicatively coupled to said ANN element, said ANN element being capable of predicting a link life for direct connection to at least one other said node.

2. A node as in claim 1, wherein for each directly connected other said node, said ANN element determines a relative velocity and predicts said link life for each based on the respective distance to each and a given propagation range.

3. A node as in claim 1, wherein said ANN element determines said link life as the time for said node to separate from another said node by said given propagation range.

4. A node as in claim 1, wherein said node includes a locational unit determining a location of said node.

5. A node as in claim 4, wherein said ANN element determines link life to another directly connected node based on the determined said location of said node and a determined location of said other directly connected node and each of said node and said other directly connected node are moving at known velocities.

6. A node as in claim 5, wherein said ANN element determines a propagation loss relationship responsive to locations of said node and another said node and a link life relationship responsive to said known velocities.

7. A node as in claim 6, wherein said ANN element determines an expected loss of a direct connection, said expected loss occurring at a zero of the difference of said link life relationship and a maximum propagation range indicated by said propagation loss relationship.

8. A node as in claim 1, wherein said ANN element further determines a reconnect time for a disconnected one of other said nodes.

9. A node as in claim 1, wherein said node is a cluster leader.

10. A node as in claim 1, wherein said node is a Network Management System (NMS) node managing said ad hoc communications network.

11. A node as in claim 1, further comprising an input/output (I/O) unit, a node user communicating with at least one other said node through said I/O unit.

12. A node as in claim 1, wherein said ANN element is an ANN neuron determining connection to other said nodes in said ad hoc communications network, said ANN neuron storing network tables and matrices indicating network connectivity and connectivity to said other nodes and communicating wirelessly with said other nodes through said wireless communications unit.

13. An ad hoc communications network comprising a plurality of nodes as in claim 12, wherein at least one of said plurality of connected nodes is a wireless mobile node.

14. An ad hoc communications network comprising:
   a plurality of nodes comprising an Artificial Neural Network (ANN), each node in communication with other said nodes of said ad hoc communications network;
   a plurality of network clusters, each cluster including one or more nodes of said plurality of nodes, one node in each cluster determining link life for connections for other nodes in said cluster and reconnect times for previously disconnected nodes;
   a storage unit in each said node, said node storing network tables and matrices indicating network connectivity, cluster and connectivity connection between said one or more nodes; and
   a wireless communications unit in each said node, said node communicating with at least one other said node wirelessly through said wireless communications unit.

15. An ad hoc communications network as in claim 14, wherein one of the plurality of said nodes is a Network Management System (NMS) node managing said ad hoc communications network and at least one other said nodes of the plurality of said nodes are cluster leaders managing communications between a respective cluster and other clusters.

16. An ad hoc communications network as in claim 14, wherein at least one said node determines a relative velocity connection to at least one said node and predicts a link life for each one based on the respective distance from each said node relative to a given propagation range.

17. An ad hoc communications network as in claim 16, wherein said one node determines said link life as the time to separate two nodes from each other by said given propagation range.

18. An ad hoc communications network as in claim 14, wherein each said node of the plurality of said nodes include a locational unit determining a location of each said node.

19. An ad hoc communications network as in claim 18, wherein at least one said node predicts said link life based on the determined said location of a first node and a determined location of second directly connected node and each of said first node and said second directly connected node are moving at known velocities.

20. An ad hoc communications network as in claim 19, wherein at least one said node determines a propagation loss relationship responsive to locations of said first node and said second directly connected node and a link life relationship responsive to said known velocities.

21. An ad hoc communications network as in claim 19, wherein at least one said node determines an expected loss of a direct connection, said expected loss occurring at a zero of the difference of said link life relationship and a maximum propagation range indicated by said propagation loss relationship.

22. An ad hoc communications network as in claim 14, wherein at least one said node includes a stochastic approximation engine (SA Engine) receiving information indicating propagation losses between a pair of directly connected nodes.

23. An ad hoc communications network as in claim 22, wherein received propagation loss information includes measured and calculated propagation loss information having both a deterministic component and a random component ($\epsilon$) of the form $d(x_m, y_m) + \epsilon_m$.

24. An ad hoc communications network as in claim 23, wherein said SA Engine recursively predicts said link life from a relationship having the form $D_{+1}=D_n-\alpha_n\{d(x_n,y_n)-\rho\}$, where:
ρ is a propagation loss threshold
n=0, 1, 2, . . . ;
$\alpha_n$ is a decreasing sequence of real numbers satisfying:
$\alpha_n \to 0$, and
$\Sigma \alpha_n \to \infty$;
$d(x_n,y_n)=d(x_n(D_n),y_n(D_n))$; and
$D_n \to D=\rho$, the spacing between a directly connected pair of nodes at said propagation loss threshold.

25. An ad hoc communications network as in claim 23, wherein said ANN element uses SA Engine in recursively predicting said link life (T) for a first node $(x_n)$ and second node $(y_n)$ located at $x_n(T_n)$, $y_n(T_n)$ from a relationship position based time sequence having the form $T_{n+1}=T_n-\alpha_n\{d(x_n, y_n)-\rho\}$, where:
ρ is a propagation loss threshold
n=0, 1, 2, . . . ;
$\alpha_n$ is a decreasing sequence of real numbers satisfying:
$\alpha_n \to 0$, and
$\Sigma \alpha_n \to \infty$;
$d(x_n,y_n)=d(x_n(T_n),y_n(T_n))$; and
$T_n \to T$ as $n \to \infty$, the link life between a first said node and said second node at said propagation loss threshold.

26. An ad hoc communications network as in claim 14, wherein at least one of the plurality of said nodes further comprise an input/output (I/O) unit, a node user communicating with said other nodes through said I/O unit.

27. A mobile communications station, said mobile communications station being mobile and comprising:
a wireless communications unit;
an Artificial Neural Network (ANN) element connectively coupled to said wireless communications unit, said ANN element being capable of predicting a link life for direct connection to at least one other said mobile communications station; and
a storage unit connectively coupled to said ANN element.

28. A mobile communications station as in claim 27, further comprising a locational unit connectively coupled to said ANN element.

29. A mobile communications station as in claim 28, wherein said locational unit is a Global Positioning Systems (GPS) unit.

30. A mobile communications station as in claim 27, further comprising an input/output (I/O) unit connectively coupled to said ANN element.

31. A mobile communications station as in claim 27, further comprising a stochastic approximation engine (SA Engine) measuring propagation loss with another directly connected mobile communications station and training said ANN element.

32. A mobile communications station as in claim 27, wherein said storage unit having network tables and matrices indicating network connectivity and connection to other mobile communication stations.

33. A mobile communications station as in claim 27, further comprising an unmanned ground vehicle, said wireless communications unit, said ANN element and said storage unit being transported by said unmanned ground vehicle.

34. A mobile communications station as in claim 27, further comprising an unmanned air vehicle, said wireless communications unit, said ANN element and said storage unit being transported by said unmanned air vehicle.

35. A mobile communications station as in claim 27, wherein said ANN element is an ANN neuron determining connection to other said nodes in said ad hoc communications network, said ANN neuron storing network tables and matrices indicating network connectivity and connectivity to said other nodes and communicating wirelessly with said other nodes through said wireless communications unit.

36. A node for use in an ad hoc communications network including a plurality of the nodes, said node comprising:
an Artificial Neural Network (ANN) element;
a stochastic approximation engine (SA Engine) measuring propagation loss with another directly connected mobile communications station and training said ANN element;
a storage unit communicatively coupled to said ANN element; and
a wireless communications unit communicatively coupled to said ANN element.

37. A node as in claim 36, wherein said SA Engine provides measurement results having both a deterministic component and a random component (ε) and the form $d(x_m, y_m)+\epsilon_m$.

38. A node as in claim 37, wherein said ANN element recursively determines said link life from a relationship having the form $D_{n+1}=D_n-\alpha_n\{d(x_n, y_n)-\rho\}$, where:
ρ is a propagation loss threshold
n=0, 1, 2, . . . ;
$\alpha_n$ is a decreasing sequence of real numbers satisfying:
$\alpha_n \to 0$, and
$\Sigma \alpha_n \to \infty$;
$d(x_n,y_n)=d(x_n(D_n),y_n(D_n))$; and
$D_n \to D=\rho$, the spacing between said node and said other directly connected node at said propagation loss threshold.

39. A node as in claim 37, wherein said ANN element recursively determines said link life (T) for $x_N$ and $y_n$ located at $x_n(T_n)$, $y_n(T_n)$ from a relationship position based time sequence having the form $T_{n+1}=T_n-\alpha_n\{d(x_n, y_n)-\rho\}$, where:
ρ is a propagation loss threshold
n=0, 1, 2,
$\alpha_n$ is a decreasing sequence of real numbers satisfying:
$\alpha_n \to 0$, and
$\Sigma \alpha_n \to \infty$;
$d(x_n,y_n)=d(x_n(T_n),y_n(T_n))$; and
$T_n \to T$ as $n \to \infty$, the link life between said node $(x_n)$ and said other directly connected node $(y_n)$ at said propagation loss threshold.

* * * * *